United States Patent [19]
Gibbon
[11] Patent Number: 5,063,012
[45] Date of Patent: Nov. 5, 1991

[54] METHOD OF MANUFACTURING ELASTOMERIC ENGINE COMPONENTS

[75] Inventor: Robert M. Gibbon, Fort Worth, Tex.
[73] Assignee: JMK International, Inc., Ft. Worth, Tex.

[21] Appl. No.: 432,081
[22] Filed: Nov. 6, 1989
[51] Int. Cl.[5] .......................... B05D 1/02; B29C 35/02
[52] U.S. Cl. ................................ 264/129; 174/138 S; 427/421; 439/125
[58] Field of Search ............................... 264/129, 131; 427/393.5; 439/125, 485; 174/35 SM, 138 S

[56] References Cited

U.S. PATENT DOCUMENTS 1,940,325 12/1933 Rabezzana .......................... 439/125
4,346,149 8/1982 Sullivan ............................ 427/393.5
4,820,219 4/1989 Fortier, Jr. et al. ............ 427/393.5

OTHER PUBLICATIONS

GE Silicone Product Data Sheet.
Article-Dunlop Flexible Paints to Protect Rubber (no date given).

*Primary Examiner*—Jan H. Silbaugh
*Assistant Examiner*—Brian J. Eastley
*Attorney, Agent, or Firm*—James E. Bradley

[57] ABSTRACT

A method is shown for reducing the degrading effect of heat upon an elastomeric component used in the engine compartment of a vehicle. The elastomeric component is first formed into the desired shape and then sprayed with a heat resistant, heat reflecting paint to create a reflective surface on the component which reduces the effect of radiant heat present in the surrounding environment and improves the life expectancy of the component.

6 Claims, 1 Drawing Sheet

METHOD OF MANUFACTURING ELASTOMERIC ENGINE COMPONENTS

BACKGROUND OF THE INVENTION

1. Field of the Invention

The present invention relates to a method for reducing the degrading effect of heat upon elastomeric engine components and to a method for manufacturing such components.

2. Description of the Prior Art

A variety of elastomeric materials are used as components found in the engine compartment of a vehicle. High temperatures generated by many internal combustion engines have adversely affected the elastomeric materials, such as those used in spark plug boots, ignition wires, engine gaskets, and the like. Such temperatures often exceed 500° F. and, with time, cause the elastomeric materials to become brittle, cracked and worn. In the area of spark plug boots, such wear reduces the effectiveness of the boot seal in maintaining and protecting the spark plug and its electrical connection to the ignition wire.

To provide spark plug boot protection in such high temperatures environments, a variety of expensive and custom made heat shields have been utilized. U.S. Pat. No. 4,671,586, issued June 9, 1987, to DeBolt, shows a spark plug shield and boot assembly which includes a heat shield formed in the shape of a thin wall cylindrical shell of aluminum or other lightweight metal which peripherally surrounds the elastomeric boot. U.S. Pat. No. 3,881,051, issued Apr. 29, 1975, to Berry, shows a spark plug boot formed of silicone rubber and having a metal screen integrally molded therein, the screen extending through one end of the boot and into engagement with the spark plug shell to provide an electrical ground for the screen. While such shields are generally effective for their intended purpose, they are costly and fail to meet the goals of improved installation, operation and serviceability.

The present invention has as its object to provide a method for reducing the degrading effects of heat upon an elastomeric engine component of the type used in the engine compartment of a vehicle.

Another object of the invention is to provide a method for reducing the effects of radiant heat upon such components without significantly increasing the cost of manufacture of the component.

Another object of the invention is to provide such a method which can be accomplished at the end of the normal manufacturing operation without interrupting the existing manufacturing line.

Additional objects, features and advantages will be apparent in the written description which follows.

SUMMARY OF THE INVENTION

In the method of the invention elastomer component is first formed into a desired shape for use in the engine compartment of a vehicle. A reflective surface is then created on the exterior of the elastomeric component by applying a, reflective metal containing composition thereto. The reflective surface is effective to reduce the effects of radiant heat present in the surrounding environment to thereby improve the life expectancy of the component.

Preferably, the, reflective metal containing composition is a heat resistant, heat reflective metal paint which is sprayed onto the elastomeric component after it is formed into the desired shape.

Additional objects, features and advantages will be apparent in the written description which follows.

DETAILED DESCRIPTION OF THE INVENTION

The method of the invention can be used to reduce the degrading effect of heat upon a variety of elastomeric components of the type typically utilized in a vehicle engine compartment, such as the engine compartment of a passenger automobile. These components include, for instance, spark plug boots, ignition wires, and engine gaskets.

Figure 1:
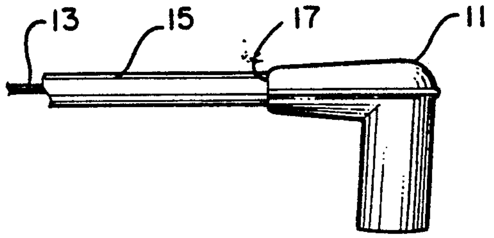
FIG. 1 is a side, perspective view of a spark plug boot manufactured according to the method of the invention.

FIG. 1 is a side view of an injection molded spark plug boot 11, the construction of which will be familiar to those skilled in the art. The boot 11 includes an ignition wire 13 which is covered by a surrounding insulating material 15 to form a cable, the cable being received within the end opening 17 of the L-shaped boot. The interior of the boot 11 also typically contains a metallic connector cap (not shown) which will fit over and engage the electrode of a spark plug to make electrical connection therewith.

Figure 2:
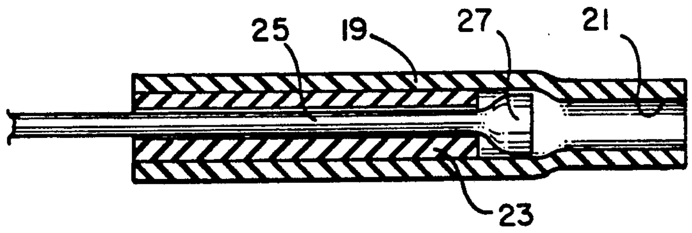
FIG. 2 is a side, cross-sectional view of another style spark plug boot manufactured according to the method of the invention.

FIG. 2 shows another typical embodiment of a spark plug boot 19 of the type having a more elongate, tubular configuration. The tubular boot 19 includes an internal bore 21 which is reduced in internal diameter by an internal sleeve 23, whereby an ignition cable 25 having an associated connector cap 27 can be received and engaged within the bore 21.

The vulcanizable elastomeric materials useful in practicing the present invention will include any curable materials capable of being formed by the method to the required shape. Thus, the components shown in FIG. 1 and 2 can be formed from a variety of elastomeric materials including natural and synthetic organic rubbers, for instance, EPDM, SBR, butyl, nitrile, and Neoprene, chlorosulponated polyethylene, fluorocarbon, urethane. The components of the invention can also be formed of silicone rubbers which are preferred because of their stability at elevated temperatures and resistance to contamination by engine fumes, leakage and the like. A typical composition of the type known in the art will contain about 100 parts silicone polymer, about 40 parts filler, from about 0.5 to 2.0 parts catalyst and from 0 to 10 parts of other enhancement additives.

Typical silicone polymers will include dimethyl polysiloxane polymers with optional vinyl groups replacing methyl groups on the polymer chain. The vinyl level will be about 0 to 5 mole percent with a molecular weight of the polymer typically being above 1 million.

Typical fillers include fume silica, precipitated silica, ground quartz, calcium carbonate, and iron oxide. Other conventional enhancement additives can be present as well, such as heat stabilizers, structure control additives, process aids and pigments.

The following example is intended to be illustrative of the preferred silicone rubber compositions which can be used to practice the method of the invention:

| | |
|---|---|
| Methyl vinyl polysiloxane polymer with 0.2 M % vinyl content | 48.0 parts |
| Structure control additive | 2 parts |
| Fume silica | 7 parts |
| Precipitated silica | 7 parts |
| Accelerator Vi (methoxy)$_3$ Si | 0.2 parts |
| Ground silica | 35.0 parts |
| 2.5-Dimethyl-2.5.Bis (t-Butylperoxy) Hexane | 0.8 parts |

Silicone rubber compositions of the above type can be cured using conventional techniques, for instance, by using known heat activated catalyst such as 2,4-dichloro benzoyl peroxide or dicumyl peroxide, or a combination of the two. Other curing methods would include, for instance, radiation cure as taught in U.S. Pat. No. 4,737,324, issued to Gibbon, Apr. 12, 1988, and assigned to the assignee of the present invention.

Figure 3:
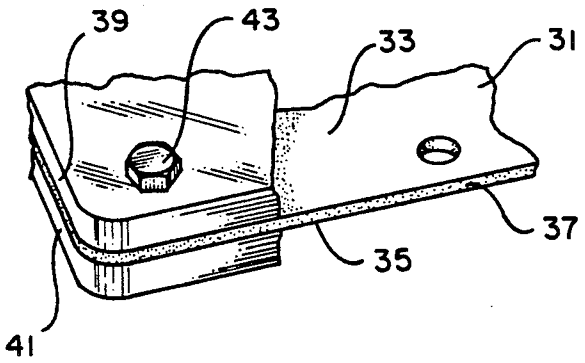
FIG. 3 is a partial, side view of an engine gasket manufactured according to the method of the invention with the confronting metal surfaces of the engine shown broken away for ease of illustration.

FIG. 3 shows another engine component, in this case a valve cover gasket 31, having planar upper and lower surfaces 33, 35 separated by a thickness which defines a side edge 37. The gasket is adapted to be received between the confronting surfaces 39, 41 of a vehicle engine, for instance the vehicle valve cover. The confronting surfaces are held in position, as by bolts 43.

Figure 4:
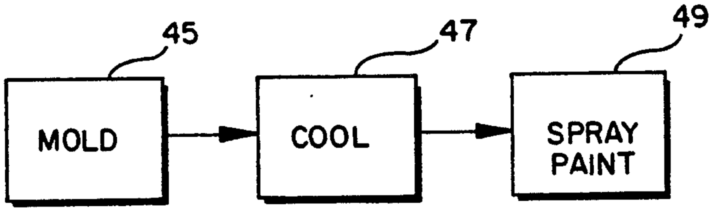
FIG. 4 is an operational diagram explaining the application of the inventive method to an existing injection molding process.

In the method of the invention, the elastomeric component is first formed into the desired shape. Thereafter, a reflective surface is created on the elastomeric component by applying a reflective metal containing composition thereto. Although the metal containing component can be compounded into the rubber composition, it is preferably applied as a spray paint after the component is formed and cured. The method used to form the engine components shown in FIG. 1-3 is illustrated schematically in FIGS. 4 and 5. In the case of the spark plug boot 11 and gasket 31, the uncured, compounded polymer can be formed into the desired shape by injection molding in a mold 45. Injection molding processes for manufacturing spark plugs are well known and described, for instance, in U.S. Pat. No. 2,745,875, issued May 8, 1956, to Simpkins, et al. After heat curing in the mold 45, the component is removed and cooled in a cooling stage 47 and thereafter spray painted or dip coated at a painting stage 49.

The component is preferably spray painted with a reflective metal containing composition to thereby create a reflective surface on the exterior of the elastomeric component. Most preferably, the reflective metal containing paint is a spray paint such as an aluminum containing silicone paint which is heat resistant in the temperature range from about 500° to 650° F. In the case of the molded boot 11, the entire exterior surface thereof would typically be spray painted with the heat reflective, heat resistant paint. If desired, the cable 15 can also be spray painted. In the case of the gasket 31, typically only the edge region 37 is painted since this is the only exposed region from between the confronting surfaces 39, 41.

A number of suitable heat resistant, heat reflective paints are commercially available and will be familiar to those skilled in the art. A preferred paint is prepared by mixing 1 gallon of SR125 silicone resin (General Electric) with 1 lb of aluminum leaf, 10 grams of curing catalyst (zinc octoate) and 1 gallon of xylene.

Figure 5:
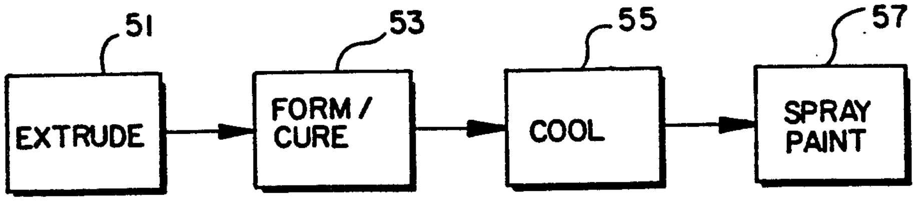
FIG. 5 is an operational diagram explaining the application of the method of the invention to an existing extrusion process.

FIG. 5 briefly describes the steps used in manufacturing the extruded boot 19. The uncured compounded polymer is extruded through an extrusion die 51. After passing through one or more partial cure and forming steps, depending on the shape of the finished article, it is finally cured at a curing station 53. The boots are then cooled at a cooling station 55 and thereafter passed to a paint station 57 for painting the exterior of the extruded tubular member. Extrusion methods for forming spark plug boots are well known in the art and are described, for instance, in U.S. Pat. Nos. 4,737,324 and 4,551,293, assigned to the assignee of the present invention, the disclosure of which is hereby incorporated by reference.

In order to illustrate the advantages obtained by the method of the invention, a silicone rubber spark plug boot without its internal metal connector was positioned at (A) 12 inches, (B) 8 inches, (C) 6 inches and (D) 4 inches, respectively, from a heat source of 600° F. The boot was maintained at each position for approximately 20 minutes and the inside and outside temperatures of the boot were recorded. The test boot was changed and the test procedure repeated at each of the selected distances from the heat source. The following results were noted:

| | Temperature Readings At Various Positions | | | | | | | |
|---|---|---|---|---|---|---|---|---|
| | A | | B | | C | | D | |
| Type Of Boot | Inside Boot | Outside Boot | Inside Boot | Outside Boot | Inside Boot | Outside Boot | Inside Boot | Outside Boot |
| (1) Black colored | 148° F. | 194° F. | 225° F. | 281° F. | 259° F. | 434° F. | 320° F. | 560° F. |
| (2) Black with silver paint on outside | 122° | 134° | 168° | 197° | 216° | 287° | 260° | 380° |
| (3) Gray colored | 164° | 189° | 242° | 270° | 270° | 434° | 315° | 545° |
| (4) Black with bronze paint on outside | 124° | 140° | 173° | 206° | 240° | 295° | 270° | 395° |
| (5) Yellow colored | 189° | 190° | 250° | 290° | 300° | 420° | 325° | 560° |
| (6) Bronze powder incorporated into 'boot' | 118° | 184° | 180° | 280° | 230° | 400° | 280° | 540° |

In another example, a conventional engine gasket and an engine gasket having side edges painted with aluminum containing silicone paint were compared to determine the radiant heat effects by placing the conventional and painted gasket between metal confronting surfaces similar to those present in an engine valve cover. After exposing the conventional and painted gasket to 300° F. for 20 minutes, the inside and outside temperatures recorded were as follows:

| | Inside Seal | Outside Seal |
|---|---|---|
| Conventional gasket | 180° F. | 211° F. |
| Painted gasket | 160° F. | 173° F. |

In another test, an organic rubber spark plug boot (EPDM) and a painted organic rubber boot (painted with aluminum/silicone paint) were exposed to 350° F. at a distance of 2 inches for 20 minutes. While the painted boot showed no effect, the unpainted boot blistered and cracked.

An invention has been provided with several advantages. The automotive industry is demanding higher and higher temperature resistance in its component parts, with temperature requirements in excess of 500° F. being quite common for rubber parts in the engine compartment. Without the reflective surface provided by the method of the invention, spark plug boots subjected to temperatures in the range of 500° to 600° in the vicinity of the exhaust manifold are breaking down and becoming ineffective. Similarly, valve cover seals subjected to temperatures in excess of 500° F. by an exhaust manifold are becoming embrittled and leaking oil. The invention provides a reflective surface on the elastomeric component by means of either painting on the surface or incorporating the reflective material into the rubber composition. By providing a reflective surface on the elastomeric component, the component outside and inside temperature is reduced during operation, thereby prolonging the life of the component.

While the invention has been shown in only one of its forms, it is not thus limited but is susceptible to various changes and modifications without departing from the spirit thereof.

I claim:

1. A method for reducing the degrading effect of radiant heat in excess of 500° F. upon an elastomeric component used in the engine compartment of a vehicle during the vehicle operation, the method comprising the steps of:

forming the elastomeric component into the desired shape;

at least partially curing the elastomeric component;

spray painting the exterior of the elastomeric component with a heat reflecting, heat resistant paint to form a reflective surface thereon, the reflective surface being effective to reduce the effects of radiant heat present in the surrounding environment to thereby improve the life expectancy of the component; and wherein the heat reflecting, heat resistant paint is an aluminum containing silicone paint which is heat resistant in the temperature range from about 500°-650° F.

2. A method for manufacturing a spark plug boot of the type used in the engine compartment of a vehicle to reduce the degrading effect of radiant heat in excess of 500° F. during the vehicle operation, the method comprising the steps of:

injection molding an elastomeric material in a suitable mold to thereby form the elastomeric material into the shape of a spark plug boot;

removing the spark plug boot from the mold;

applying a heat reflecting, heat resistant paint to the exterior of the spark plug boot and wherein the heat reflecting, heat resistant paint is an aluminum containing silicone paint which is heat resistant in the temperature range from about 500°-650° F.

3. The method of manufacturing a spark plug boot of claim 2, wherein the elastomeric material is a silicone rubber.

4. The method of manufacturing a spark plug boot of claim 2, wherein the elastomeric material is an organic rubber.

5. The method of claim 2, wherein the heat reflecting, heat resistant paint is sprayed onto the exterior of the spark plug boot.

6. A method for manufacturing a spark plug boot of the type used in the engine compartment of a vehicle to reduce the degrading effect of radiant heat in excess of 500° F. during the vehicle operation, the method comprising the steps of:

extruding a tube from a selected uncured elastomeric material;

forming the extruded elastomeric material into the shape of a spark plug boot;

at least partially curing the spark plug boot;

applying a heat reflecting, heat resistant paint to the exterior of the spark plug boot and wherein the heat reflecting, heat resistant paint is an aluminum containing silicone paint which is heat resistant in the temperature range from about 500°-650° F., the paint being sprayed onto the exterior of the spark plug boot.

* * * * *